(12) United States Patent
Walde et al.

(10) Patent No.: US 8,216,451 B2
(45) Date of Patent: *Jul. 10, 2012

(54) APPARATUS FOR THE FILTRATION OF LIQUIDS

(75) Inventors: Hilmar Walde, Wallbach (DE); Stefan Gröss, Geuensee (CH); Gunder Guckes, Waldems (DE)

(73) Assignee: Brita GmbH, Taunusstein (DE)

( * ) Notice: Subject to any disclaimer, the term of this patent is extended or adjusted under 35 U.S.C. 154(b) by 997 days.

This patent is subject to a terminal disclaimer.

(21) Appl. No.: 11/628,024

(22) PCT Filed: Apr. 27, 2005

(86) PCT No.: PCT/EP2005/004484
§ 371 (c)(1),
(2), (4) Date: Apr. 2, 2007

(87) PCT Pub. No.: WO2005/118104
PCT Pub. Date: Dec. 15, 2005

(65) Prior Publication Data
US 2007/0227955 A1 Oct. 4, 2007

(30) Foreign Application Priority Data
May 28, 2004 (DE) .......................... 10 2004 026 167

(51) Int. Cl.
*B01D 27/08* (2006.01)
*B01D 29/085* (2006.01)
(52) U.S. Cl. ........ 210/109; 210/419; 210/232; 210/477; 210/482

(58) Field of Classification Search .................. 210/477, 210/482, 109, 419, 232; 222/189.07
See application file for complete search history.

(56) References Cited

U.S. PATENT DOCUMENTS

| | | | | |
|---|---|---|---|---|
| 3,561,506 | A * | 2/1971 | Johnson | 141/360 |
| 4,133,769 | A * | 1/1979 | Morgan, Jr. | 210/455 |
| 4,626,350 | A | 12/1986 | Reid | |
| 6,178,290 | B1 * | 1/2001 | Weyrauch et al. | 392/445 |
| 6,405,875 | B1 * | 6/2002 | Cutler | 210/477 |
| 6,524,477 | B1 * | 2/2003 | Hughes | 210/282 |

FOREIGN PATENT DOCUMENTS

| | | |
|---|---|---|
| DE | 196 08 372 A1 | 9/1997 |
| DE | 198 46 583 A1 | 10/1998 |
| DE | 19846583 A1 * | 4/2000 |
| DE | 19905601 A1 * | 8/2000 |

(Continued)

OTHER PUBLICATIONS

English translation of DE 20200880 U1 published May 2003.*

(Continued)

*Primary Examiner* — Terry Cecil
(74) *Attorney, Agent, or Firm* — Flaster/Greenberg PC

(57) ABSTRACT

The invention describes an apparatus for the filtration of liquids and an associated filter cartridge 100, wherein the quantitative flow through the filter cartridge can be reduced and set in a simple way. The apparatus is characterized in that at least one throttling device 200, 200' is arranged between the outlet opening 113 of the filter cartridge 100 and the outflow opening 17 of the receiving chamber 14.

25 Claims, 19 Drawing Sheets

FOREIGN PATENT DOCUMENTS

| | | |
|---|---|---|
| DE | 19915829 A1 * | 10/2000 |
| DE | 20200880 U1 * | 5/2003 |
| EP | 285908 A * | 10/1988 |
| EP | 0 324 634 A1 | 7/1989 |
| EP | 0 793 464 B1 | 11/1999 |
| GB | 2 197 647 A1 | 5/1988 |
| GB | 2 271 106 A1 | 4/1994 |
| WO | WO 9622045 A | 7/1996 |
| WO | WO 0109040 A1 | 8/2001 |
| WO | WO 2004014519 A2 * | 2/2004 |

OTHER PUBLICATIONS

English translation of EP 285908 A, published Oct. 1988.*
German language Opposition Brief dated May 5, 2008 issued for corresponding European Patent No. 1 748 830.
English translation of the German language Opposition Brief dated May 5, 2008 issued for corresponding European Patent No. 1 748 830.

* cited by examiner

APPARATUS FOR THE FILTRATION OF LIQUIDS

BACKGROUND OF THE INVENTION

1. Field of the Invention

The invention relates to an apparatus for the filtration of liquids.

2. Description of the Related Art

Filter cartridges are to be understood as meaning on the one hand cartridges which have a screen-like formation for mechanical filtration. On the other hand, filter cartridges are also to be understood as meaning cartridges which, in addition to a screen-like formation, contain at least one filter medium, e.g. in granule form, which is used for the chemical and/or mechanical removal of organic and/or inorganic contaminants and/or to lower the levels of such contaminants. Filter cartridges equipped in this way therefore allow non-mechanical filtration, which may be combined with mechanical filtration. These filter cartridges are used to optimize water, the term optimization being understood as meaning mechanical and/or non-mechanical filtration. This includes, for example, softening and decalcification of drinking water.

A very wide range of embodiments of apparatuses for the filtration of liquids are known.

By way of example, there are filter apparatuses with spherical filter cartridges, which are screwed onto the inlet funnel from below by means of a bayonet catch, as described in WO 2004/014519 A2.

DE 199 05 601 A1 has disclosed an apparatus for the treatment of liquids, having an inlet funnel which has a receiving opening with a sealing rim. The filter cartridge is likewise fitted into the receiving opening from below and is pressed into the receiving opening by means of a separate securing ring. For this purpose, the filter cartridge is provided with a groove on the cartridge upper part below the sealing rim; the lower portion of the securing ring engages in this groove. The upper portion of the securing ring is guided in a groove of a connection piece formed integrally on the funnel base. The filter cartridge is complex to install and remove, requiring particular skill on the part of the operator.

Other embodiments provide for the inlet funnel to have, in its base wall, a receiving opening, into which the filter cartridge is fitted from above. The filter cartridge generally has a conical sealing rim, which bears against the edge of the receiving opening. The filter cartridge may become tilted during insertion, so that the intended sealing position is not adopted.

DE 199 158 29 A1 has disclosed a filter cartridge and an apparatus for treating liquids, in which the sealing rim has additional latching means, which interact with corresponding latching means in the region of the opening in the base of the inlet funnel. The latching means are brought into engagement with one another by a rotational movement.

In this embodiment, the filter cartridge is held only at the edge and is located in the filtrate space. If the apparatus is a kettle, therefore, the filter cartridge is also in the boiling space, which means that the filter cartridge could be damaged during the heating of the filtered liquid. Therefore, it is desirable for the filter cartridge to be arranged such that it is shielded from the filtrate space or boiling space.

Inlet funnels with a receiving chamber for the filter cartridge are used to remedy this problem. In this design too, the conical sealing rim of the filter cartridge bears against the rim of the receiving opening in the base wall of the inlet funnel.

The peripheral and base wall of the filter cartridge is arranged at a distance from the peripheral and base wall of the receiving chamber, so that during filtration, although filtered liquid can collect in this intermediate space, this liquid does not limit the quantitative flow through the apparatus. An outflow opening provided with a closure element is located in the base wall of the receiving chamber.

DE 198 46 583 A1 has disclosed a water filter device of this type, with a collection can and a heating element. The inlet funnel has a receiving chamber, into which the filter cartridge is fitted from above. The receiving chamber is formed by a filter insert, which may be fixedly connected to the inlet funnel or can be fitted into the receiving opening. The filter insert is matched to the conical shape of the filter cartridge and forms a guide element for the filter cartridge. Since the peripheral wall of the filter cartridge bears against the filter insert over its full surface, the two components can only be separated from one another with difficulty, in particular if the user pushes the filter cartridge too deep into the filter insert. On account of the fact that two conical surfaces are sliding along one another, it is not clear to the user when he has reached the limit position which is required for optimum seating of the filter cartridge and defines the sealing position of the filter cartridge.

In all the known filter apparatuses, it is necessary for the filter cartridge to be matched to the desired quantitative flow.

BRIEF SUMMARY OF THE INVENTION

It is an object of the invention to provide a filter cartridge and an apparatus for the filtration of liquids which makes it easy to reduce and adjust the quantitative flow through the filter cartridge.

This object is achieved by an apparatus in which at least one throttling device is arranged between the outlet opening in the filter cartridge and the outflow opening in the receiving chamber.

The quantitative flow through the filter cartridge substantially depends on the type of filter medium and the size of the outlet opening(s) in the filter cartridge. Depending on the particular application, for example in filter systems of which a high performance is demanded of the filter medium, it may be necessary to reduce the quantitative flow which is predetermined by the filter cartridge. To achieve this, hitherto the cartridge has been modified, i.e. suitable filter cartridges had to be produced and kept in stock for every desired quantitative flow. The advantage of the throttling device is firstly that only one type of filter cartridge is required, and the quantitative flow can be set by selecting a suitable receiving chamber or a suitable inlet funnel.

Secondly, it is advantageous with this configuration that if the cartridge is not present the appliance can be operated without any flow restrictions.

It is preferable for the throttling device to be designed in such a manner that the quantitative flow delivered by the filter cartridge can be reduced by more than 0 up to 95%, in particular by 10 to 80%, particularly preferably by 20 to 70%.

It is preferable for the filter cartridge to be arranged in the region between outlet opening and outflow opening, at a distance from the peripheral wall and/or base wall of the receiving chamber, thereby forming a flow passage. The minimum cross section of the flow passage then forms the throttling device.

Alternatively, the outflow opening or outflow openings may form the throttling device, in which case the cross section of the outflow opening/openings is smaller than the cross section of the outlet opening/outlet openings in the filter cartridge.

The outflow opening may preferably be arranged in the base region, in particular in the base wall, of the receiving chamber.

For a predetermined filter cartridge, the throttling device may be adjustable by selecting a receiving chamber of suitable dimensions or with a suitable cross section of the outflow opening.

The desired quantitative flow can therefore be set by means of the inlet funnel, which is advantageous in that the inflow funnel, unlike the filter cartridge, does not represent a consumable item. The consumable item formed by the filter cartridge only has to be produced and kept in stock in one design, and the quantitative flow can be defined by the selection of inlet funnel. This makes it possible to significantly reduce the manufacturing costs of the apparatus and the costs of spares.

It is preferable for the outflow opening in the receiving chamber to be arranged above the outlet opening in the filter cartridge, so as to create a siphon-like arrangement. A siphon-like arrangement of this type has the advantage, in particular in conjunction with the throttling device, that the filter medium is kept moist even in the event of breaks in filtration, and therefore its full operational readiness is ensured even without renewed conditioning.

It is preferable for the inlet funnel to have at least one first fixing means below the receiving opening, and for the filter cartridge to have at least one second fixing means below and at a distance from the sealing rim; when the filter cartridge is being fitted into the receiving opening, the at least one second fixing means interacts with the first fixing means.

The filter cartridge can preferably be fitted into the receiving opening in its axial direction.

The fixing means are arranged in such a manner that during interaction they define the position of the filter cartridge, i.e. when the fixing means interact, on the one hand, the sealing rim of the filter cartridge in its intended position bears against the edge of the receiving opening, and, on the other hand, also defines the cross section of the flow passage and therefore the throttling device.

The interaction of the fixing means is associated with a resistance, which is perceptible to the user when he is fitting the filter cartridge and indicates to the user that the intended position of the filter cartridge has been reached.

Since the fixing means define the position of the filter cartridge, it is advantageous if the distance between sealing rim and fixing means is selected to be as great as possible. This prevents the filter cartridge from tilting or being incorrectly positioned.

Therefore, the second fixing means are preferably arranged on the lower half, preferably in the bottom third, of the filter cartridge, in particular in the region of the base wall of the filter cartridge.

The first and/or second fixing means may be spacer elements and/or guide elements and/or latching elements. This means that a fixing means can perform one or more functions, and that it is also possible for a plurality of fixing means of different configurations to be realized in an apparatus.

The cross section of the flow passage can be accurately set by the fixing means.

A preferred embodiment provides for at least one fixing means to form the throttling device. By way of example, if a spacer element formed integrally on the filter cartridge or the receiving chamber is arranged in the flow passage, the cross section is reduced at this location. The action of the throttling device can easily be set by means of the dimensions of one or more spacer elements of this type.

The fixing means are preferably projections or recesses. The projections or recesses may be cylindrical, conical or frustoconical in form. These forms also include, for example, indentations and protuberances or beads.

In the case of latching elements, latching bosses, latching recesses or annular beads are preferred.

In the simplest case, the fixing means may be spacer elements. By way of example, at least one outwardly facing projection may preferably be formed integrally on the base wall of the filter cartridge as second fixing means, which projection, during fitting of the filter cartridge, is seated on a holding element which is arranged on the inlet funnel and forms the first fixing means.

The first fixing means may, for example, also be the base wall of a receiving chamber arranged at the inlet funnel.

Conversely, by way of example, it is also possible for the holding element, which may form the base wall of the receiving chamber, to have at least one inwardly facing projection, which interacts with the base wall of the filter cartridge, which in this case forms the second fixing means.

The fixing means may also be guide elements, which means that the filter cartridge is guided into its intended position when it is being fitted. By way of example, projections and recesses, in particular indentations on the filter cartridge and on the holding element which, by way of example, may be cylindrical, conical or frustoconical in form, are suitable for this purpose.

According to a further embodiment, the fixing means may also be latching elements which engage in one another as they interact. The latching or snapping into place is generally associated with a noise which indicates to the user that the filter cartridge has reached its intended position.

The fixing means are preferably matched to one another in such a manner that fitting the filter cartridge in the axial direction is sufficient to bring the fixing means together. Therefore, there is no need either for rotary, tilting or other movements of the filter cartridge or for additional components, such as securing rings or the like, which overall makes insertion of the filter cartridge user-friendly.

Furthermore, the fixing means are matched to one another in such a manner that they can be detached from one another without particular effort when the filter cartridge is being exchanged.

This is achieved, inter alia, by the contacting surfaces of the fixing means being kept small in the case of guide elements, in order to prevent the filter cartridge from jamming or sticking in place.

If the fixing means are designed as latching elements, the latching or clamping forces are kept low, in such a manner that the filter cartridge can be removed by simply being pulled out of the receiving opening in the axial direction. The latching elements are therefore preferably designed in such a manner that an axial movement of the filter cartridge is sufficient to fit or remove it.

It is preferable for the first fixing means to be arranged on a holding element arranged at the underside of the funnel base wall. A holding element of this type may be designed in various ways.

According to a particular embodiment, the holding element may be a receiving chamber which is arranged in the funnel base wall, has at least one outflow opening and has a base wall and a peripheral wall.

Preferably, the base wall of the receiving chamber has at least one first indentation, and the base wall of the filter cartridge has at least one second indentation, which engages over the first indentation. These two indentations may interact in a sliding manner and thereby form guide elements. More-over, these indentations may also be provided with latching elements which engage in one another when the filter cartridge is being fitted.

It is preferable for the indentations of filter cartridge and receiving chamber to be arranged at a distance from one another at least in subregions, so that a reduced cross section of flow, which forms the throttling device, is set between the indentations.

Preferably, the first indentation is a cylindrical or frustoconical hollow body, which is formed integrally on the base wall of the receiving chamber, faces inwards and has at least one inwardly facing first bead, which is in the shape of an arc of a circle and leaves clear at least one outflow opening, arranged on its free edge, wherein an outwardly facing mandrel, which engages in the cylindrical or frustoconical hollow body when fitting the filter cartridge, is arranged in the second indentation.

In this embodiment, the first guide element is formed by the at least one bead, which is in the form of an arc of a circle and slides along the outer side of the mandrel when the filter cartridge is being inserted. The bead does not extend over the entire inner periphery of the hollow body, and consequently a free space remains which, after fitting of the mandrel, which represents the second guide element, forms the outflow opening. A plurality of arcuate beads or bead segments may be arranged at a distance from one another in the peripheral direction, so that a plurality of outflow openings are created.

A preferred embodiment provides for the cross section of the outflow opening(s) defined by the bead(s) on the cylindrical or frustoconical hollow body to be selected in such a way that this/these outflow opening(s) has/have a throttling action.

According to a further embodiment, the mandrel has at least one second bead in the shape of an arc of a circle on its outer side, which second bead engages behind the first bead during fitting of the filter cartridge. In this case, the first and second beads form latching elements.

It is preferable for the hollow body and the mandrel each to be arranged centrally. This arrangement has the advantage that in each case only one fixing means is required, and as a result the space required for the fixing means can be kept small, and consequently more volume is available for the filter medium.

It is preferable for the receiving chamber to have the first indentation in the region of base and peripheral wall and for the filter cartridge to have the second indentation likewise in the base and peripheral wall.

The first and second indentations may preferably be cuboidal in form, so that the two indentations each have two side walls, one end wall and one covering wall. The two indentations may be in the form of guide elements which engage in one another or slide into one another.

It is advantageous if the first indentation has first latching means on two side walls and the second indentation has second latching means on two side walls. This embodiment has the advantage that it is possible to realize greater latching forces, for example in devices in which water is heated. The two indentations may have different dimensions, which brings the advantage that there is only one possible position for the filter cartridge.

The fixing elements allow accurate positioning of the filter cartridge, so that not only is the optimum position of the sealing rim at the receiving opening ensured, but also a defined distance can be set between the filter cartridge and the wall of the receiving chamber. The cross section of the flow passage between outlet opening of the filter cartridge and outflow opening of the receiving chamber can thus likewise be set in a targeted way.

The presence of fixing means also allows a new type of configuration of the sealing rim of the filter cartridge, allowing the correct seating of the filter cartridge and the sealing position to be improved further.

For this purpose, it is provided that the sealing rim is a snap-action rim which is connected to one of the two cartridge parts via an integral hinge, it being possible for the sealing rim to be flipped from a first, lower snap-action position into an upper, second snap-action position and vice versa, and the funnel base having a sealing seat which surrounds the receiving opening and into which the snap-action rim snaps in its second position.

With the snap-action rim in its lower snap-action position, the filter cartridge is fitted into the receiving opening from above and pressed downwards until the snap-action rim flips upwards and in the process snaps into the sealing seat. The sealing seat is matched to the snap-action rim in such a manner that when the snap-action rim has snapped into place, the filter cartridge bears in a sealing manner against the edge of the receiving opening and is fixed in place.

The snap-action indicates to the user that the filter cartridge has adopted its predetermined sealing position. This prevents both incorrect positioning by the user and slipping of the filter cartridge during transport.

To remove the filter cartridge, it is simply pulled out upwards, during which operation the snap-action rim flips into its lower snap-action position.

The snap-action rim is preferably formed by a flat edge strip which extends outwards in the radial direction.

In this embodiment, fixing means in the form of guide elements are sufficient. Fixing means in the form of latching elements could be disadvantageous, insofar as with so-called double latching at the sealing rim and, for example, in the base region, the production costs are high on account of the need to maintain tolerances.

In the case of a filter cartridge in which the cartridge upper part has an outwardly facing first securing flange and the cartridge lower part has an outwardly facing second securing flange, via which the two cartridge parts are connected to one another, the snap-action rim is preferably connected to one of the two securing flanges by way of the integral hinge.

The sealing seat at the inlet funnel is matched to this snap-action rim. It is preferable for the sealing seat to merge into a conically protruding rim section with an inwardly open abutment section, on which the outer edge of the snap-action rim engages.

The abutment section may be a groove or a step with at least one inclined surface.

The filter cartridge, which can be fitted into the inlet funnel and has a cartridge upper part with at least one inlet opening, a cartridge lower part with at least one outlet opening and a sealing rim, is characterized by at least one fixing means arranged below and at a distance from the sealing rim.

The fixing means at the filter cartridge is preferably a spacer element and/or guide element and/or latching element. The fixing means may be recesses and projections, the projections or recesses preferably being cylindrical, conical or frustoconical in form. The latching element may be a latching boss, a latching recess or an annular bead.

The fixing means is preferably arranged in the region of the lower half of the filter cartridge, preferably in the region of the bottom third and in particular in the region of the base wall of the filter cartridge.

The cartridge lower part has at least one indentation, with an outwardly facing mandrel preferably being arranged in the indentation.

According to a further embodiment, the indentation may also be cuboidal in form.

The sealing rim is preferably a snap-action rim which is connected to one of the two cartridge parts via an integral hinge, it being possible for the snap-action rim to be flipped from a first, lower snap-action position into an upper, second snap-action position and vice versa.

If the filter cartridge has a sealing flange on its upper and lower parts, the snap-action rim is preferably connected to one of the two securing flanges by way of the integral hinge.

The snap-action rim is preferably formed by a flat edge strip which is directed radially outwards.

BRIEF DESCRIPTION OF THE SEVERAL VIEWS OF THE DRAWINGS

Exemplary embodiments of the invention are explained in more detail below with reference to the drawings, in which.

DETAILED DESCRIPTION OF THE INVENTION

Figure 1:
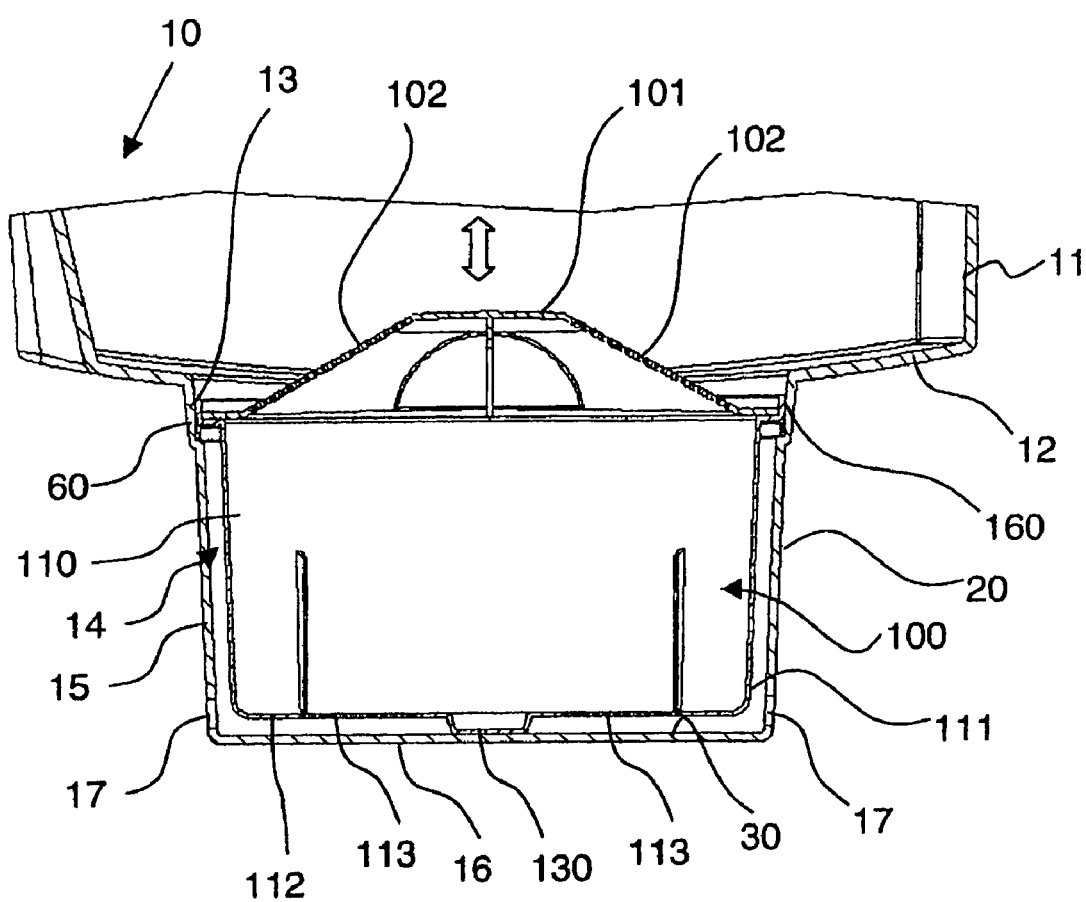
FIGS. 1 and 2 show vertical sections through an inlet funnel with fitted filter cartridge in accordance with two embodiments.

FIG. 1 illustrates a vertical section through an inlet funnel 10 with fitted filter cartridge 100. The inlet funnel 10 has a peripheral wall 11, which merges into a funnel base wall 12 which has a receiving opening 13. A receiving chamber 14, which once again has a peripheral wall 15 and a base wall 16, extends downwards from the receiving opening 13 as holding element 20.

The filter cartridge 100 is fitted into this receiving chamber 14 axially from above; the filter cartridge 100 comprises a cartridge upper part 101 and a cartridge lower part 110. The cartridge upper part 101 is configured in the shape of a roof and has inlet openings 102. A sealing rim 160, which bears against the sealing seat 60 of the inlet funnel in the region of the receiving opening 13, is provided in the connection region of cartridge upper part 101 and cartridge lower part 110.

The cartridge lower part 110 of the filter cartridge 100 has a peripheral wall 111 and a base wall 112, in which outflow openings 113 are arranged.

The receiving chamber 14 is configured in such a manner that the peripheral wall 111 of the filter cartridge 100 is arranged at a distance from the peripheral wall 15 and from the base wall 16. Consequently, the filtered liquid collects in the lower region of the receiving chamber 14 and flows away via the outflow openings 17 shown to the right and left in the figure.

The receiving chamber 14 with the peripheral wall 15 and the base wall 16 forms a holding element 20 for the filter cartridge 100. A second fixing means 130, which in the embodiment shown here forms a spacer element, is formed integrally in the centre of the base wall 112 of the filter cartridge 100. This second fixing element 130 bears against the inner side of the base wall 16, which therefore performs the function of a first fixing element 30.

The filter cartridge 100 is fitted into and removed from the receiving chamber 14 of the inlet funnel 10 in the axial direction, as indicated by the double arrow. When the limit position provided during fitting is reached, the second fixing means 130 bears against the first fixing means 30, i.e. the base wall 16 of the receiving chamber 14. The operator notices this as a result of the resistance which then occurs, which indicates to the operator that the limit position has been reached. In this limit position, the sealing rim 160 bears in a sealing manner against the sealing seat 60 of the receiving opening 13. As a result, the optimum position of the filter cartridge 100 has been reached.

Figure 2:
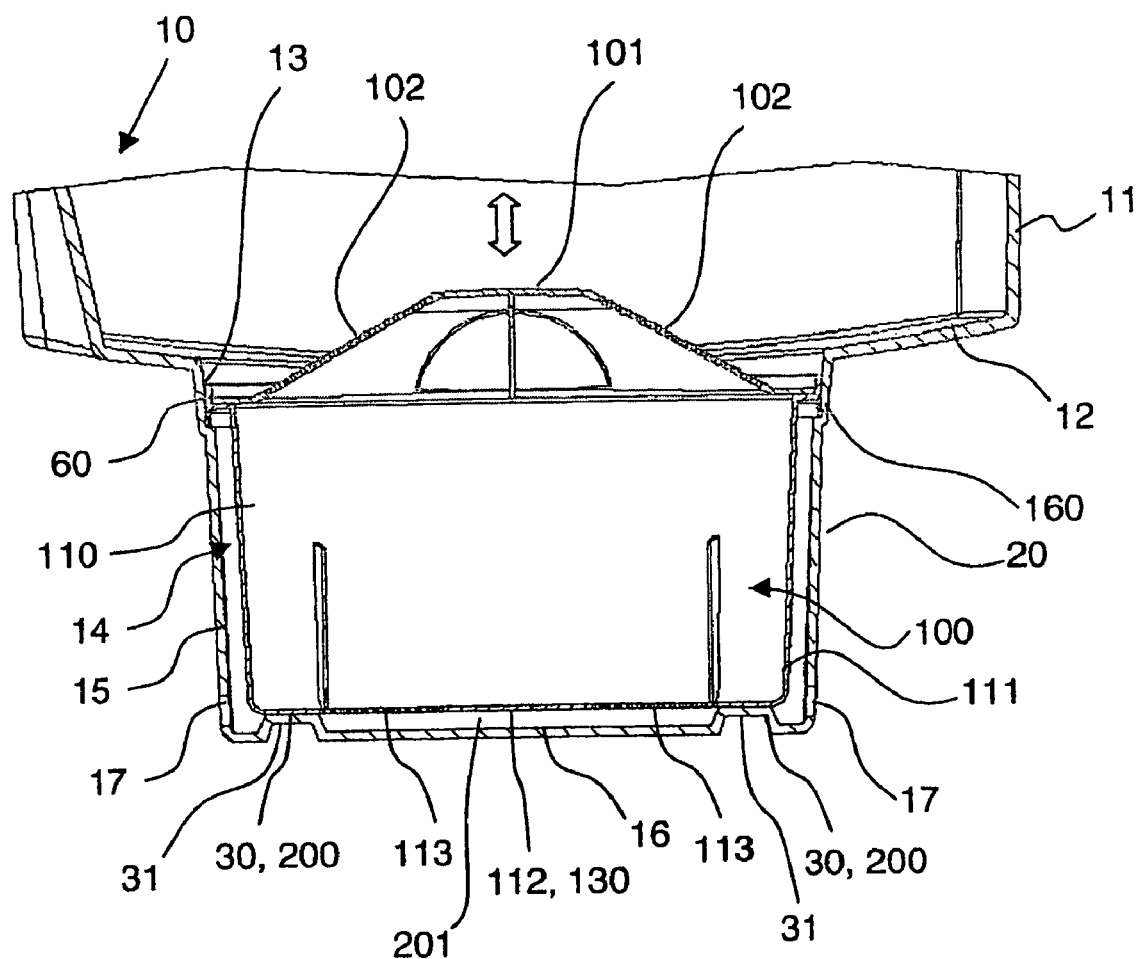

FIG. 2 illustrates a further embodiment of the apparatus, which differs from the apparatus shown in FIG. 1 by virtue of the fact that two first fixing means 30, in the form of indentations 31 designed as spacer elements, are formed integrally on the inner side of the base wall 16. The base wall 112 of the filter cartridge 100 bears against these two spacer elements 30.

In this embodiment, the base wall 112 performs the function of the second fixing means 130.

The two first fixing means 30 are arranged in the flow passage 201 between the outlet openings 113 and the outflow openings 17 and at this location reduce the cross section of flow. Depending on the particular configuration and dimensions, the fixing elements 30 in each case form a throttling device 200.

Figure 3:
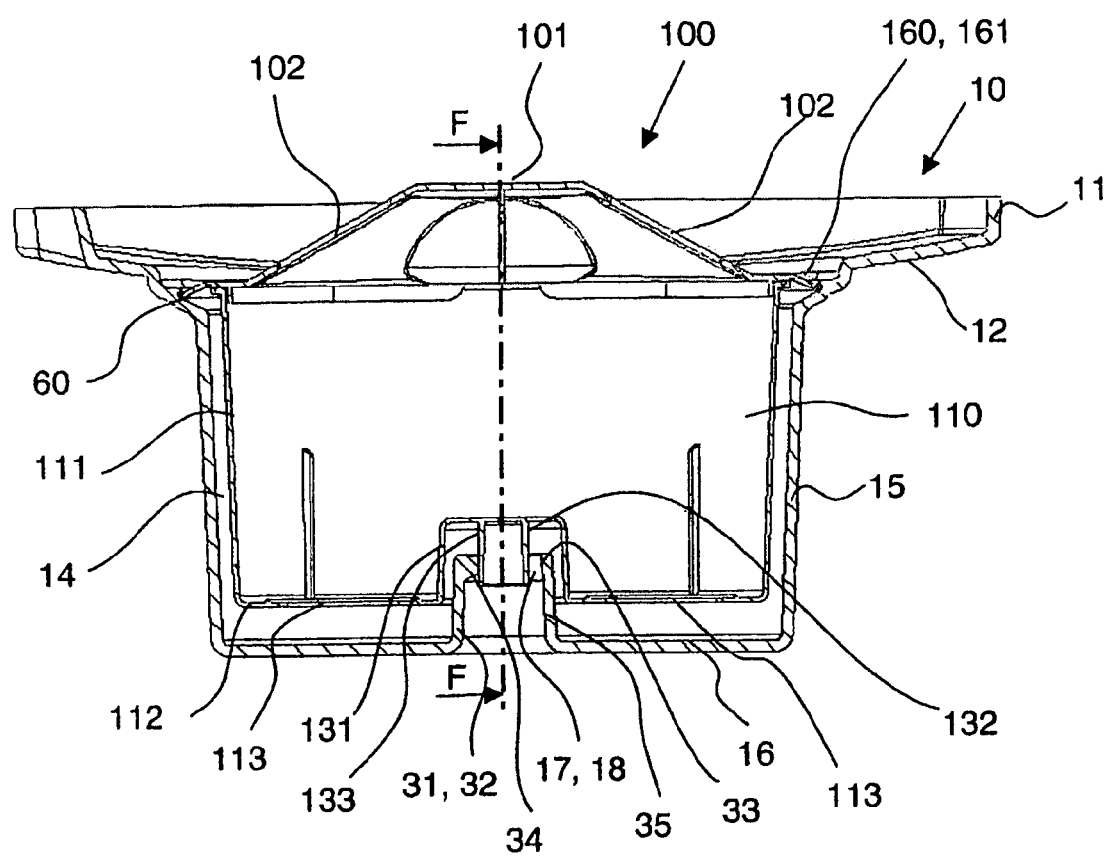
FIG. 3 shows a vertical section through an inlet funnel with fitted filter cartridge in accordance with a further embodiment, before the filter cartridge has reached its limit position.
Figure 7A:
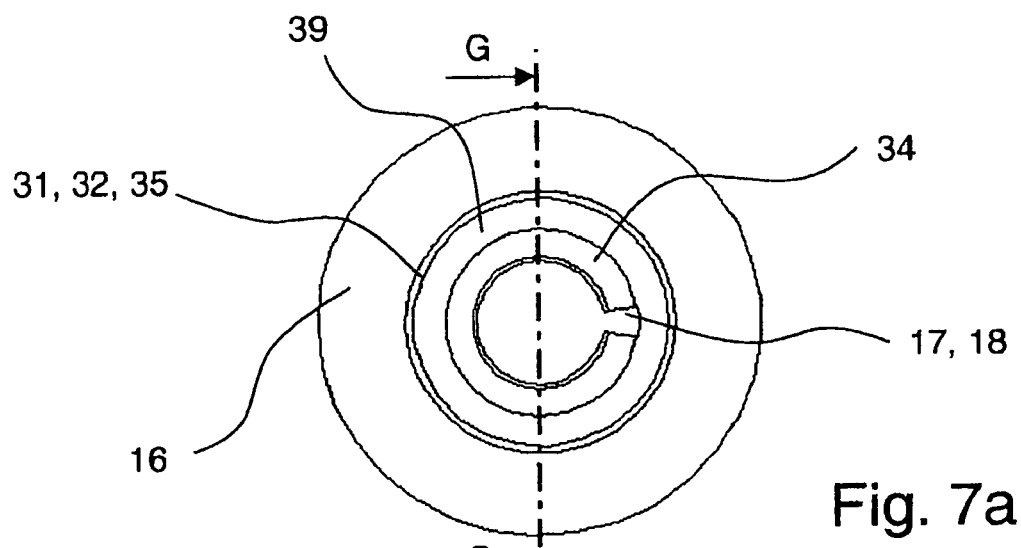
FIG. 7a shows a plan view of the frustoconical hollow body in accordance with FIG. 3.

FIG. 3 illustrates a vertical section through a further embodiment of the apparatus. The inlet funnel 10, of which the upper part has been omitted for the sake of clarity, has a first indentation 31, which is designed a frustoconical hollow body 32, arranged in the centre of its base wall 16. A bead 34 in the form of an arc of a circle is formed integrally on the inner side of the free edge 33 of the hollow body 32, which bead 34, as illustrated in FIG. 7a, does not form a continuous ring, but rather has a free space 18 which forms the outflow opening 17 after the filter cartridge has been fitted.

In its base wall 112, the filter cartridge 100 likewise has an indentation 131 in which a mandrel 132, which extends vertically downwards, is formed integrally. When the filter cartridge 100 is being fitted into the receiving chamber 14, the mandrel 132 engages in the frustoconical hollow body 32, with the outer surface 133 of the mandrel 132 sliding along the bead 34. In this embodiment, the mandrel 132 and the bead 34 form first and second fixing means 30, 130 which serve as guide elements. The outflow opening 17 is formed between the outer surface 133 of the mandrel 132 and the wall 35 of the hollow body 32.

FIG. 3 illustrates the filter cartridge 100 at the start of the fitting operation. The sealing rim 160, which in the embodiment shown here is designed as a snap-action rim 161, is therefore not yet in its limit position. The snap-action rim 161 will be described separately below.

Figure 4:
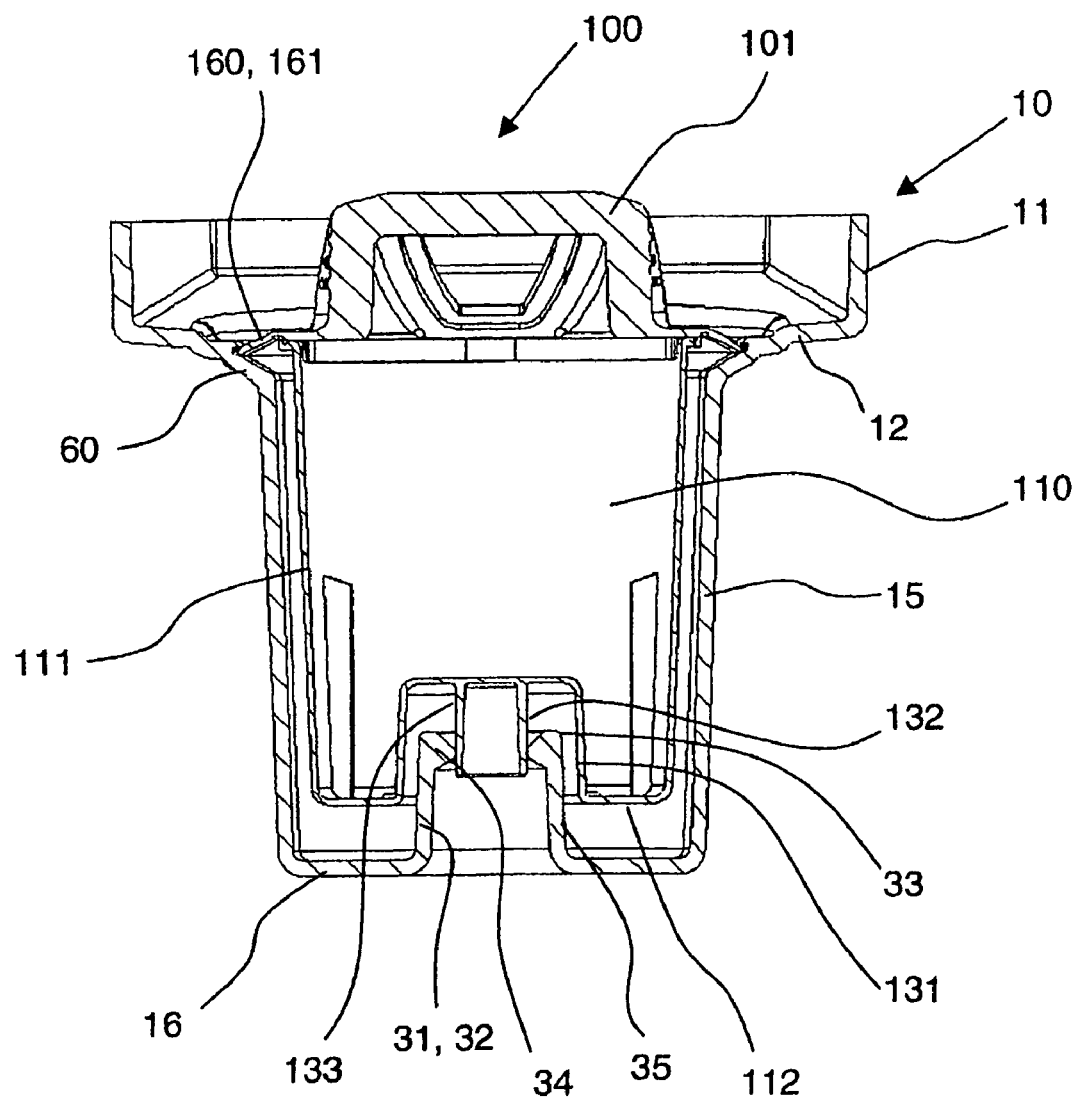
FIG. 4 shows a section on line F-F through the apparatus shown in FIG. 3.

FIG. 4 illustrates a section on line F-F through the apparatus shown in FIG. 3. It can be seen from this figure that the mandrel 132 bears against the bead 34 in the form of an arc of a circle and at this location also forms a seal apart from the outflow opening 17 (which is not visible in FIG. 4).

Figure 5:
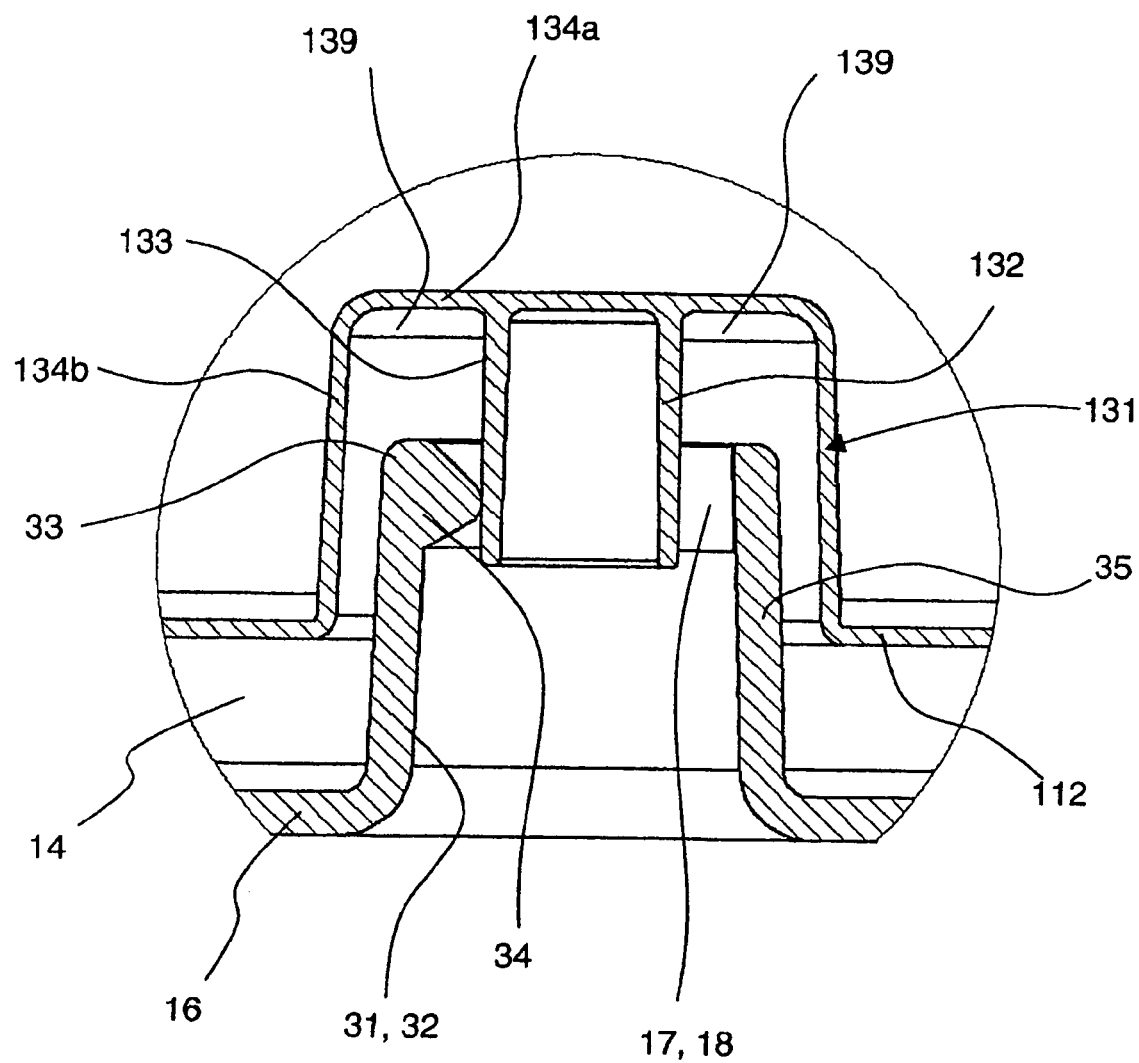
FIG. 5 shows an enlarged sectional illustration of the region of the two indentations in accordance with FIG. 3.

FIG. 5 illustrates an enlarged view of the lower region of filter cartridge 100 and receiving chamber 14, illustrating the fitting state in accordance with FIG. 3. The second indentation 131 has a base wall 134a and an annular wall 134b, which extends upwards from the base wall 112. Spacer ribs 139 are formed integrally on the underside of the base wall 134a.

Figure 6:
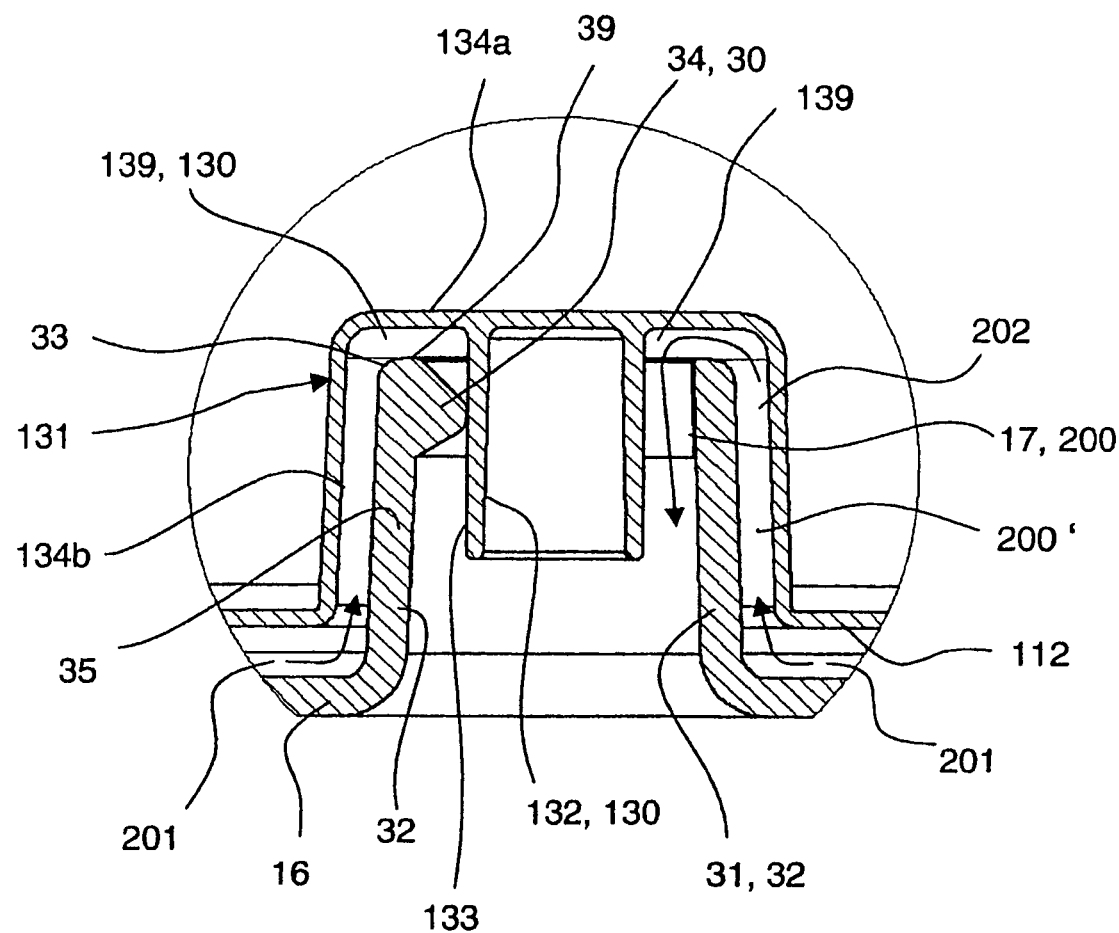
FIG. 6 shows an enlarged sectional illustration of the region of the two indentations after the filter cartridge has been fitted and positioned.

In FIG. 6, the filter cartridge 100 has reached its limit position and therefore its sealing position. A flow passage 201 is formed between the base wall 112 of the filter cartridge 100 and the base wall 16 of the receiving chamber 14 and merges, in the region of the two indentations 31, 131, into a rising annular passage 202 which is formed between wall 35 of the hollow body 32 and the annular wall 134b. The cross section of the annular passage 202 is smaller than that of the flow passage 201, so that a throttling device 200' is formed.

However, the annular passage 202 only forms the throttling device 200' if the outflow opening 17 has a significantly larger cross section. In the embodiment shown here, there is only a single outflow opening 17, which has a smaller cross section of flow than the cross section of the annular passage 202, and consequently the outflow opening 17 can be equated to the throttling device 200'. The two fixing elements 30, 130 in the form of the annular bead 34 and in the form of the mandrel 132 therefore form the throttling device 200 in the assembled state. The spacer ribs 139 bear against the end face 39 of the hollow body 32 and therefore, as spacer elements, form second fixing means 130.

Figure 7B:
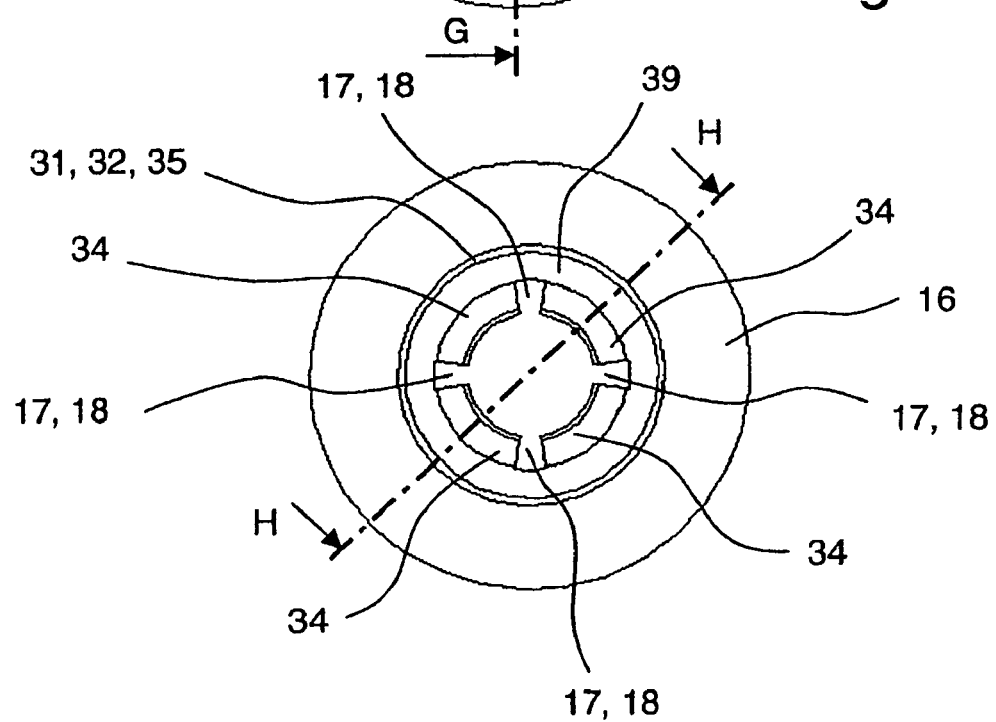
FIG. 7b shows a plan view of a frustoconical hollow body in accordance with the a further embodiment.

FIG. 7b illustrates a further embodiment of the hollow body 32, which differs from the embodiment illustrated in FIG. 7a by virtue of the fact that a total of four beads 34 in the form of arcs of a circle are arranged spaced apart from one another, so that free spaces 18 for the outflow openings 17 in each case remain between the beads 34. Whether the combination of these outflow openings form a throttling device 200 depends on the cross-sectional dimensions of the flow passage, in particular of the annular passage 202 in the region of the frustoconical hollow body 32.

Figure 8:
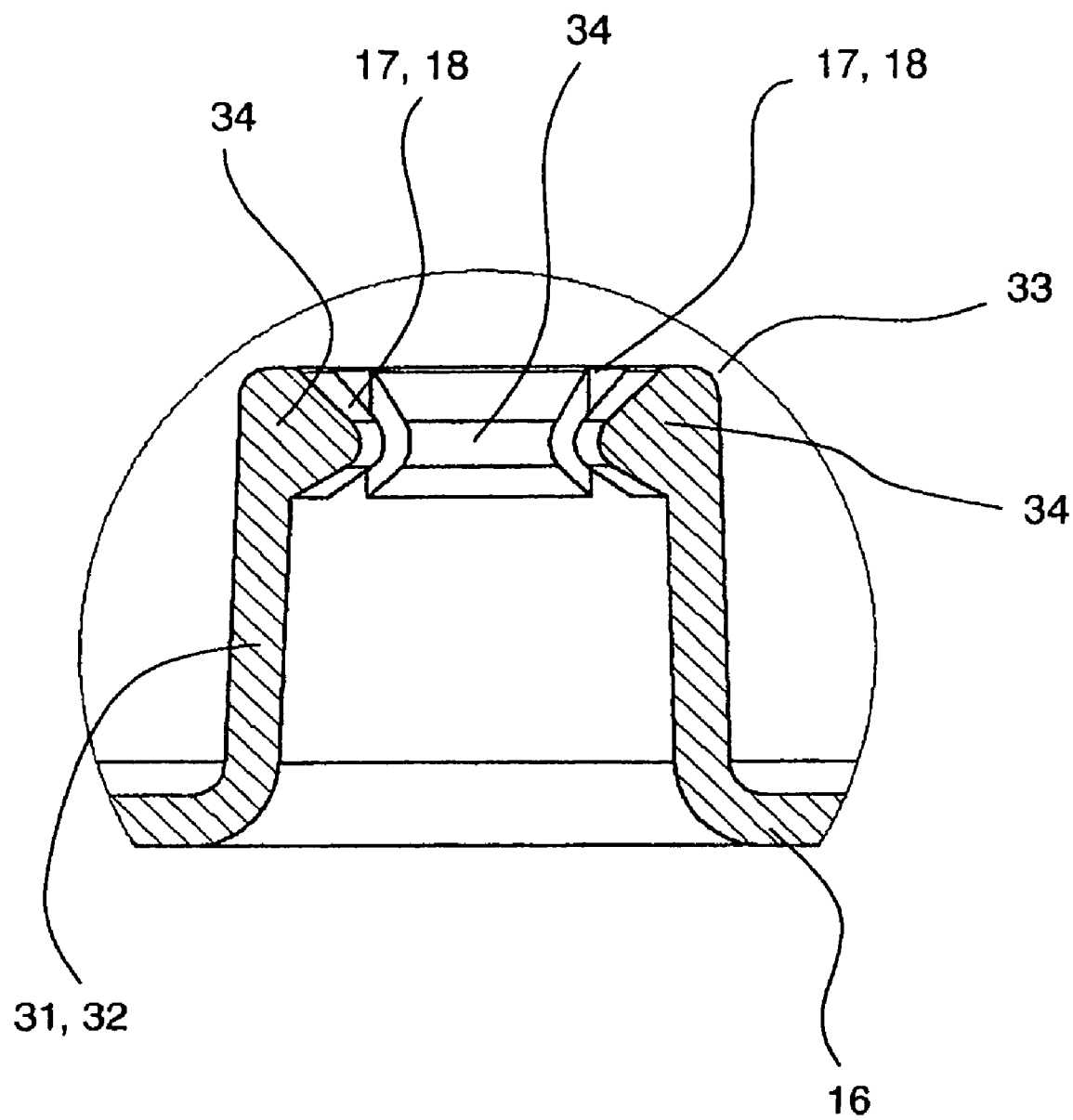
FIG. 8 shows a vertical section through the frustoconical hollow body on line H-H in FIG. 7b.

FIG. 8 illustrates the hollow body 32 in vertical section on line H-H in FIG. 7b. The triangular shape of the arcuate beads 34 has the advantage of minimizing the surface area of the contact surface with the mandrel that is to be introduced, so that the frictional forces are correspondingly low and the filter cartridge can be fitted and removed without difficulty.

Figure 9:
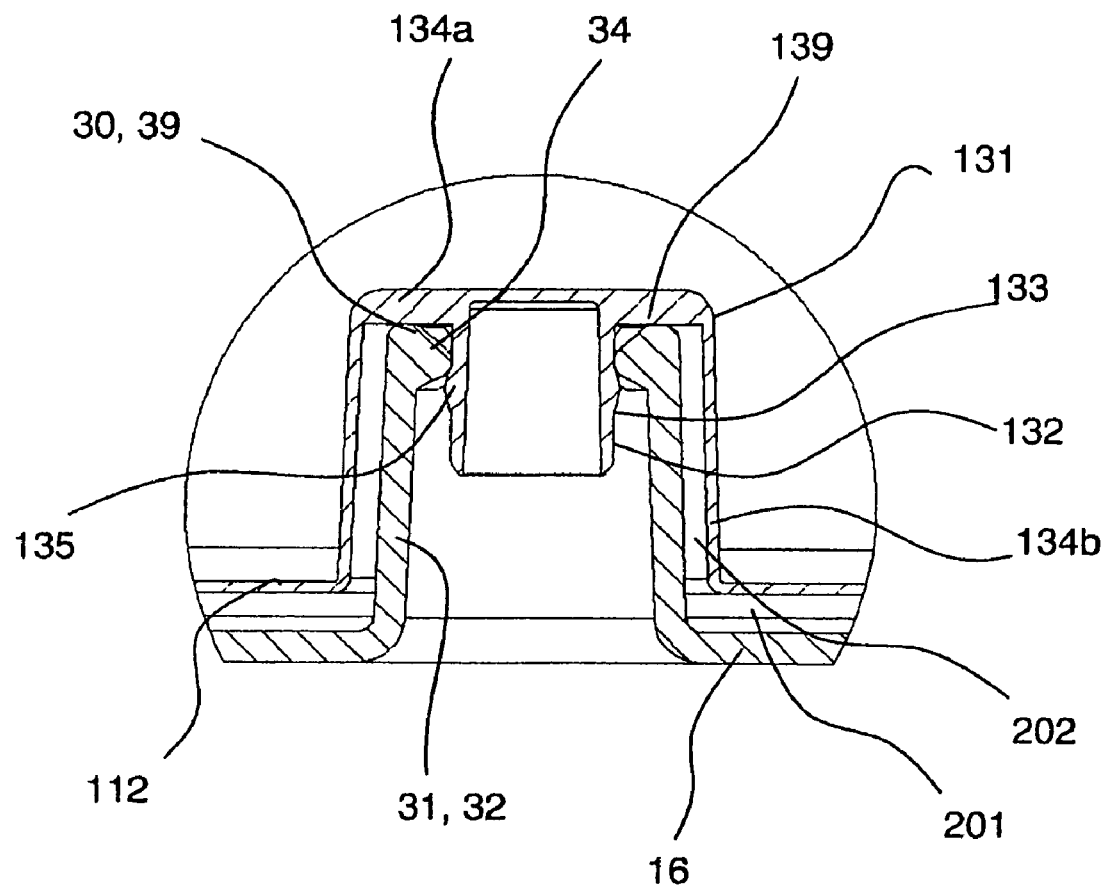
FIG. 9 shows an enlarged sectional illustration of the lower region of the two indentations in accordance with a further embodiment, on line G-G through the frustoconical hollow body in FIG. 7a, FIG. 10 shows a vertical section through a filter cartridge.

FIG. 9 illustrates a further embodiment, in which the mandrel 132 is likewise provided with a bead (second bead) 135 on its outer surface. In this case, the section through the frustoconical hollow body 32 is taken on line G-G from FIG. 7a. When the filter cartridge 100 is being fitted, the mandrel 132 engages in the hollow body 32, with the annular bead 135 engaging behind the bead 34 when the spacer ribs 139 are bearing against the end face 39. Free spaces (not visible in this figure) are provided between the spacer ribs 139, so that the liquid can flow to the outflow opening 17. In this embodiment, the beads 34 and 135 form latching elements, and the spacer ribs 139 form spacer elements, with the end face 39 of the hollow body 32, as first fixing means 30, forming a stop.

Figure 10:
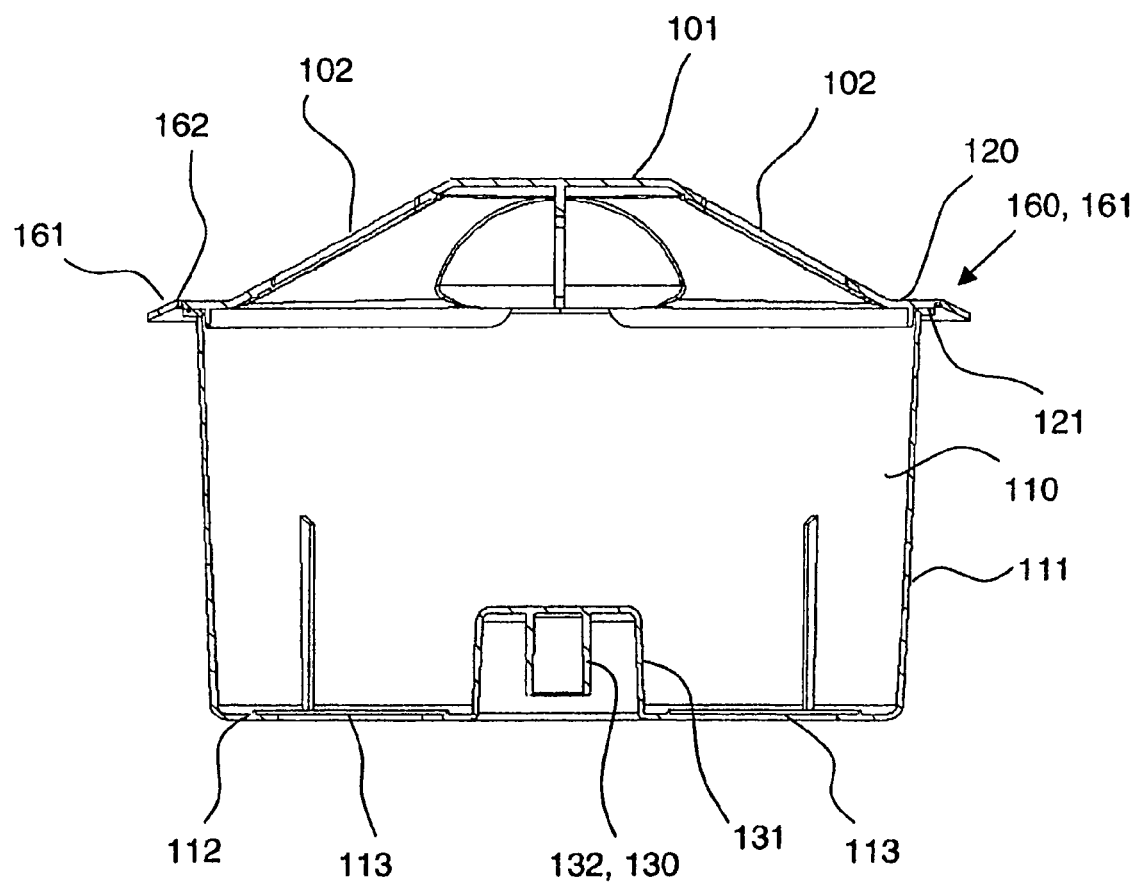

FIG. 10 illustrates a vertical section through a filter cartridge 100 in order to explain the function of the sealing rim 160 in conjunction with the following figures. The cartridge upper part 101 has a securing flange 120, which is joined to the securing flange 121 of the cartridge lower part 110, preferably by welding. The securing flange 120 extends radially outwards and has an integral hinge 162, via which the snap-action rim 161 is attached in jointed fashion. The snap-action rim 161 is formed by a flat edge strip directed radially outwards.

Figure 11:
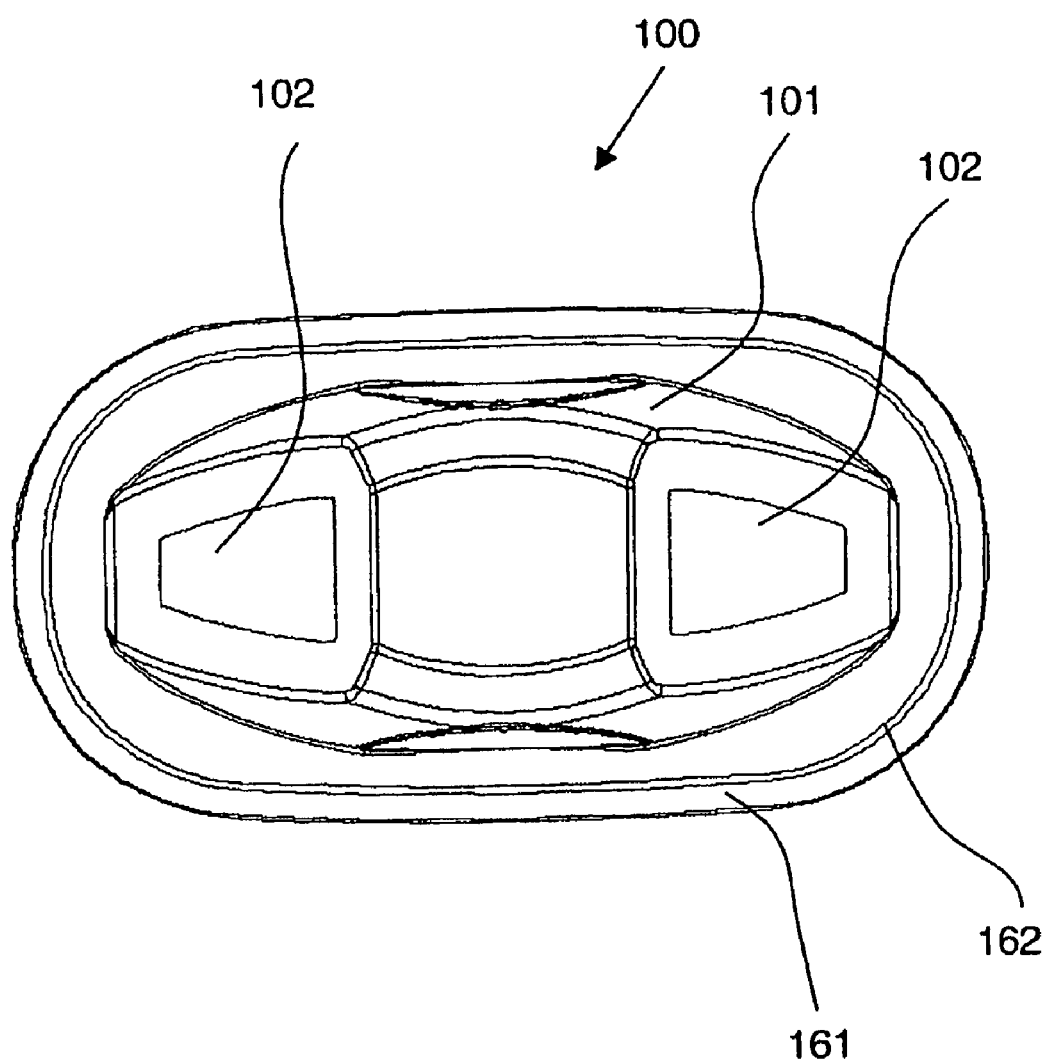
FIG. 11 shows a plan view of the filter cartridge shown in FIG. 10.

FIG. 10 illustrates the snap-action rim 161 in its lower position. As illustrated in FIG. 11, the snap-action rim 161 is designed to run continuously all the way around, as is the integral hinge 162. A dead centre has to be overcome when the snap-action rim is being flipped from a lower snap-action position into an upper snap-action position.

Figure 12:
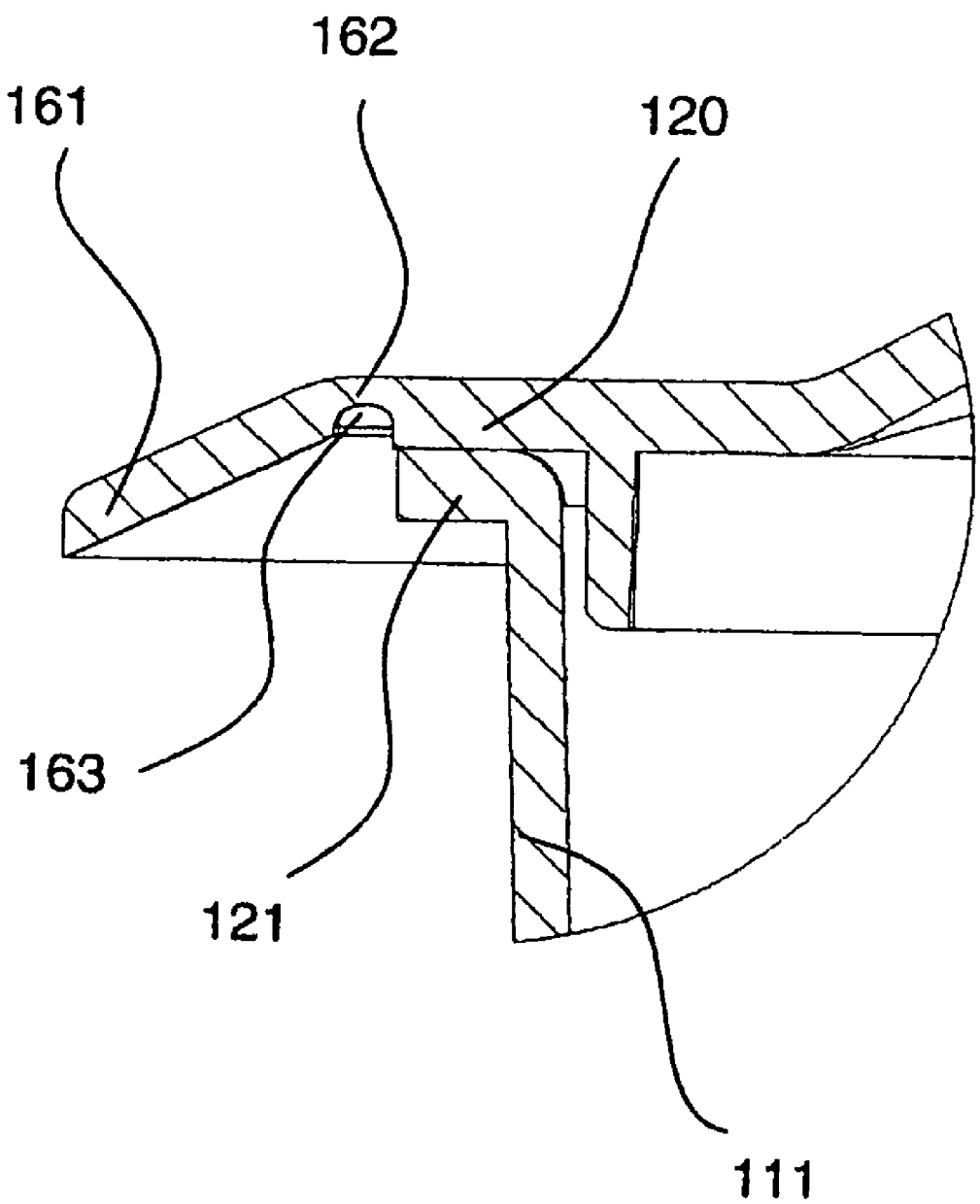
FIG. 12 shows an enlarged sectional illustration of an edge region of the filter cartridge illustrated in FIGS. 10 and 11.

FIG. 12 illustrates the snap-action rim 161 on an enlarged scale. The integral hinge 162 is formed as an encircling groove 163 on the underside of the securing flange 120.

Figure 13:
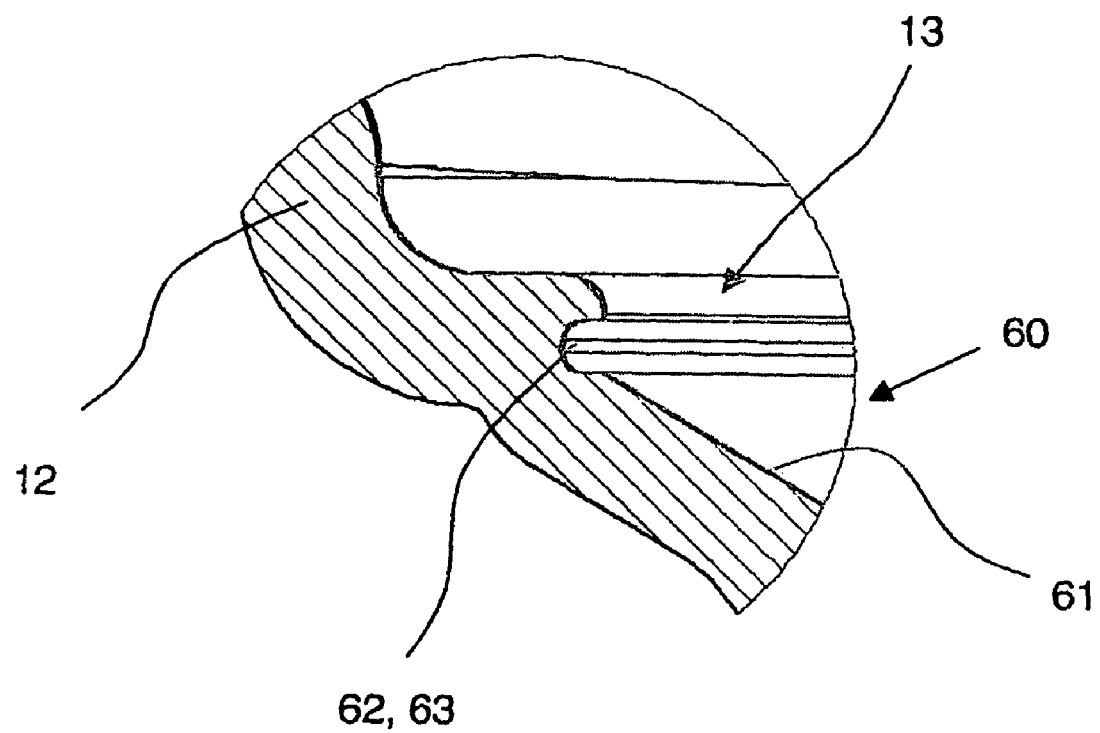
FIG. 13 shows an enlarged sectional illustration of a region of the receiving opening in the inlet funnel.

FIG. 13 illustrates the corresponding receiving opening 13 in section and on an enlarged scale. The sealing seat 60 with which the snap-action rim 161 interacts during fitting of the filter cartridge has a conically protruding edge section 61, which merges into the abutment section 62, which in the embodiment shown in FIG. 13 is designed as a groove 63. The groove 63 is open on the radially inner side, so that the snap-action rim 161 can engage therein, as can be seen in the following FIGS. 14 and 15.

Figure 14:
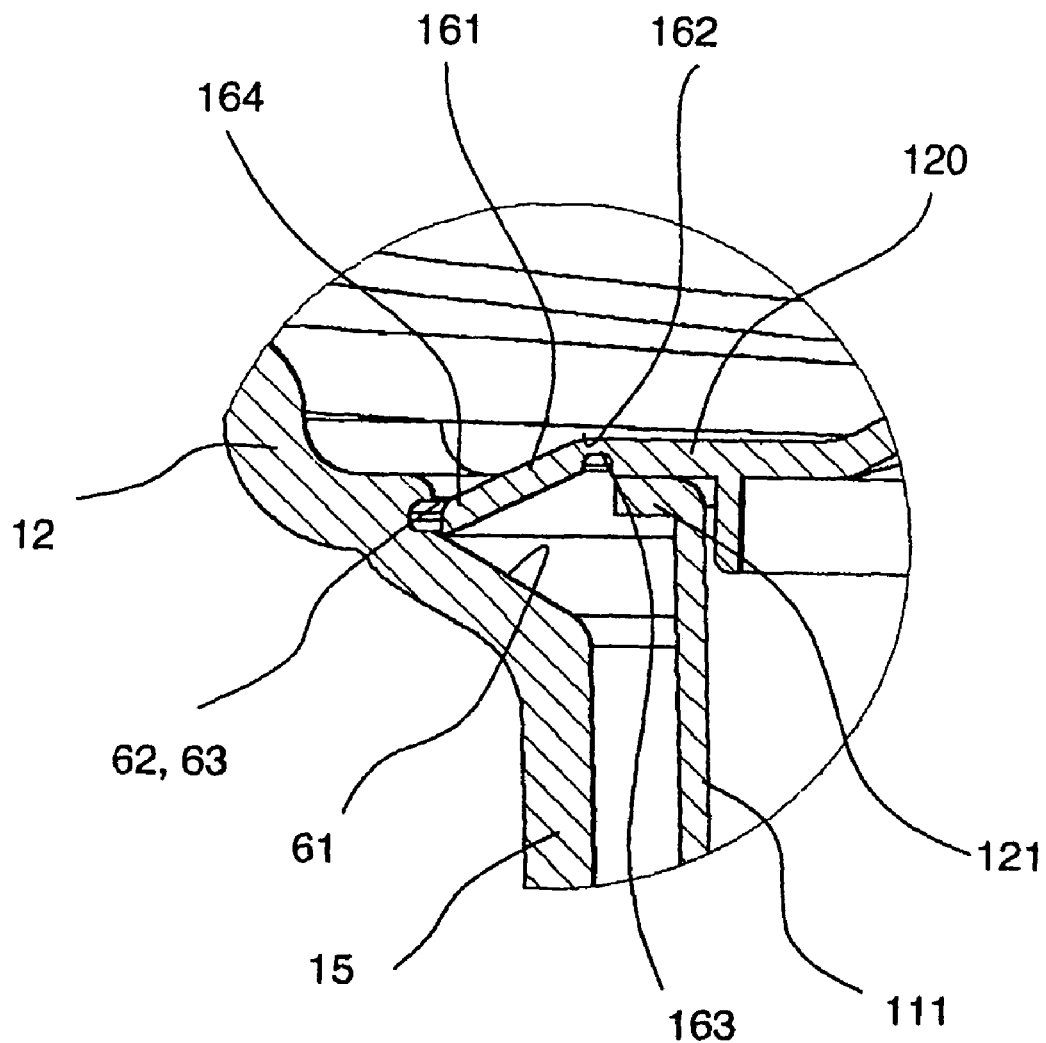
FIG. 14 shows an enlarged sectional illustration of the region of the receiving opening in the inlet funnel with initially positioned snap-action rim of a filter cartridge.

FIG. 14 illustrates the start of the snap-action process. The snap-action rim 161 is still in its lower position and is engaging against the conically protruding edge section 61.

Figure 15:
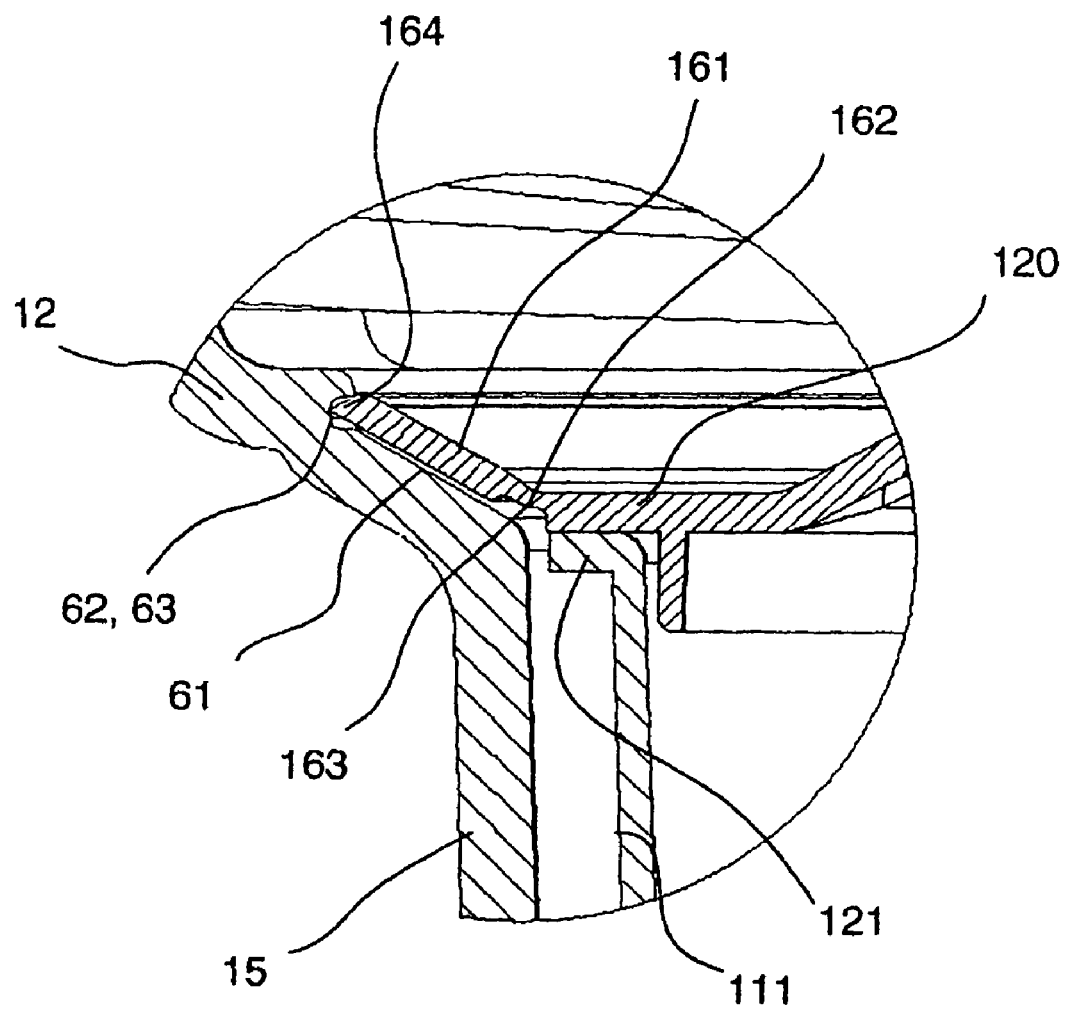
FIG. 15 shows an enlarged illustration of the region of the receiving opening of an inlet funnel with the snap-action rim of the filter cartridge snapped into position.

As the filter cartridge 100 continues to be lowered, the snap-action rim 161 is moved into its upper position, with the outer edge 164 of the snap-action rim 161 engaging in the groove 63, as illustrated in FIG. 15. There is no need for the whole of the surface of the snap-action rim 161 to bear against the surface 61. Sealing is effected in the region of the groove 63.

Figure 16:
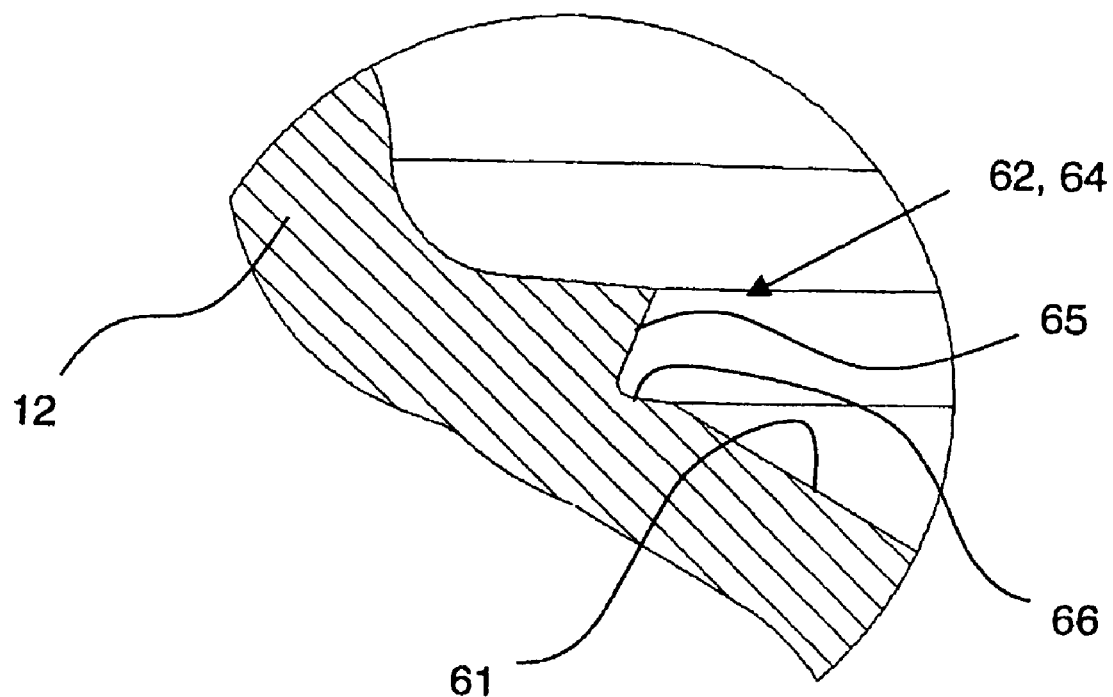
FIG. 16 shows a vertical section through the region of the receiving opening in the inlet funnel in accordance with a further embodiment.

FIG. 16 illustrates an alternative to the groove 63. The abutment section 62 comprises a step 64 which has a substantially horizontal surface 66 and an inwardly inclined surface 65.

Figure 17:
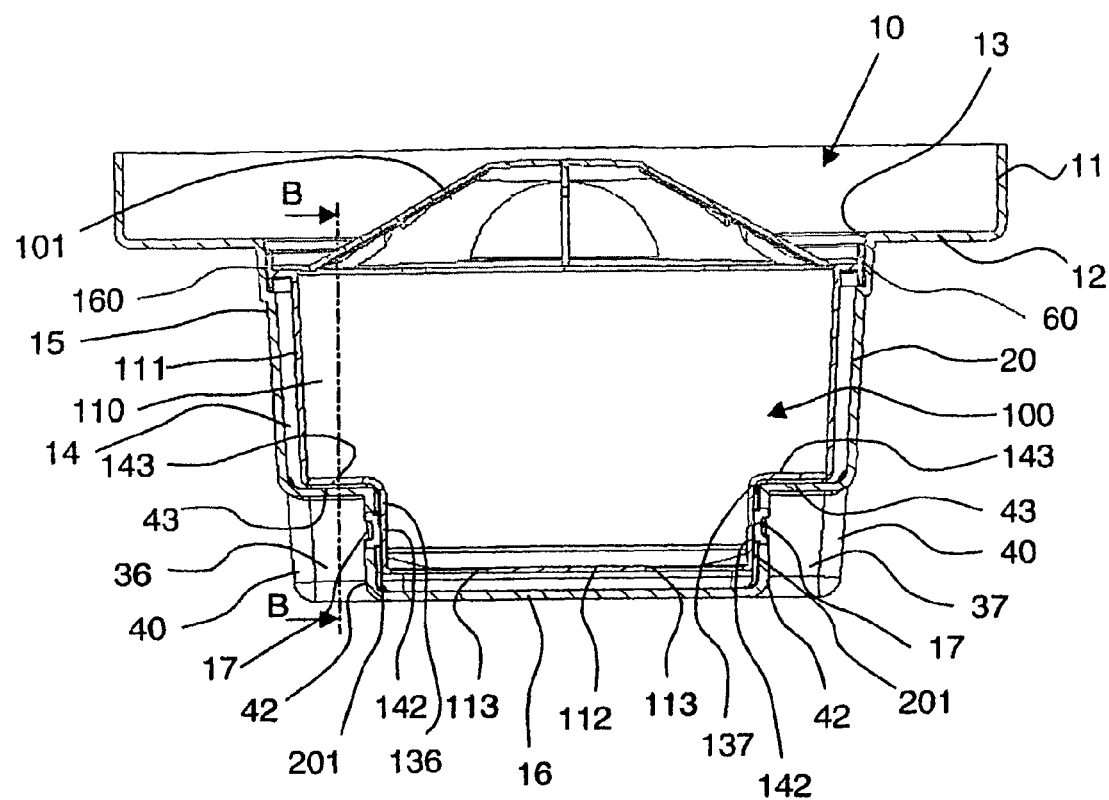
FIG. 17 shows a vertical section through an inlet funnel with a fitted filter cartridge in accordance with a further embodiment.

FIG. 17 illustrates a vertical section through an inlet funnel 10 with fitted cartridge 100 in accordance with a further embodiment. The filter cartridge 100 has a conventional sealing rim 160, which bears against the sealing seat 60 in the region of the receiving opening 13. Two cuboidal indentations 36 and 37 are formed integrally in the peripheral wall 15 and the base wall 16 of the receiving chamber 14. These indentations 36, 37 each have two side walls 40, 41 (not visible), an end wall 42 and a covering wall 43. The outflow opening 17 is located in the end wall 42.

The cartridge 100 also has corresponding indentations 136 and 137, which are likewise cuboidal in design, with side walls 140, 141 (not visible in FIG. 17), end wall 142 and covering wall 143, with the mutually corresponding walls of cartridge and receiving chamber being arranged at a distance from one another, so that flow passages 201 are formed between the walls.

Figure 18:
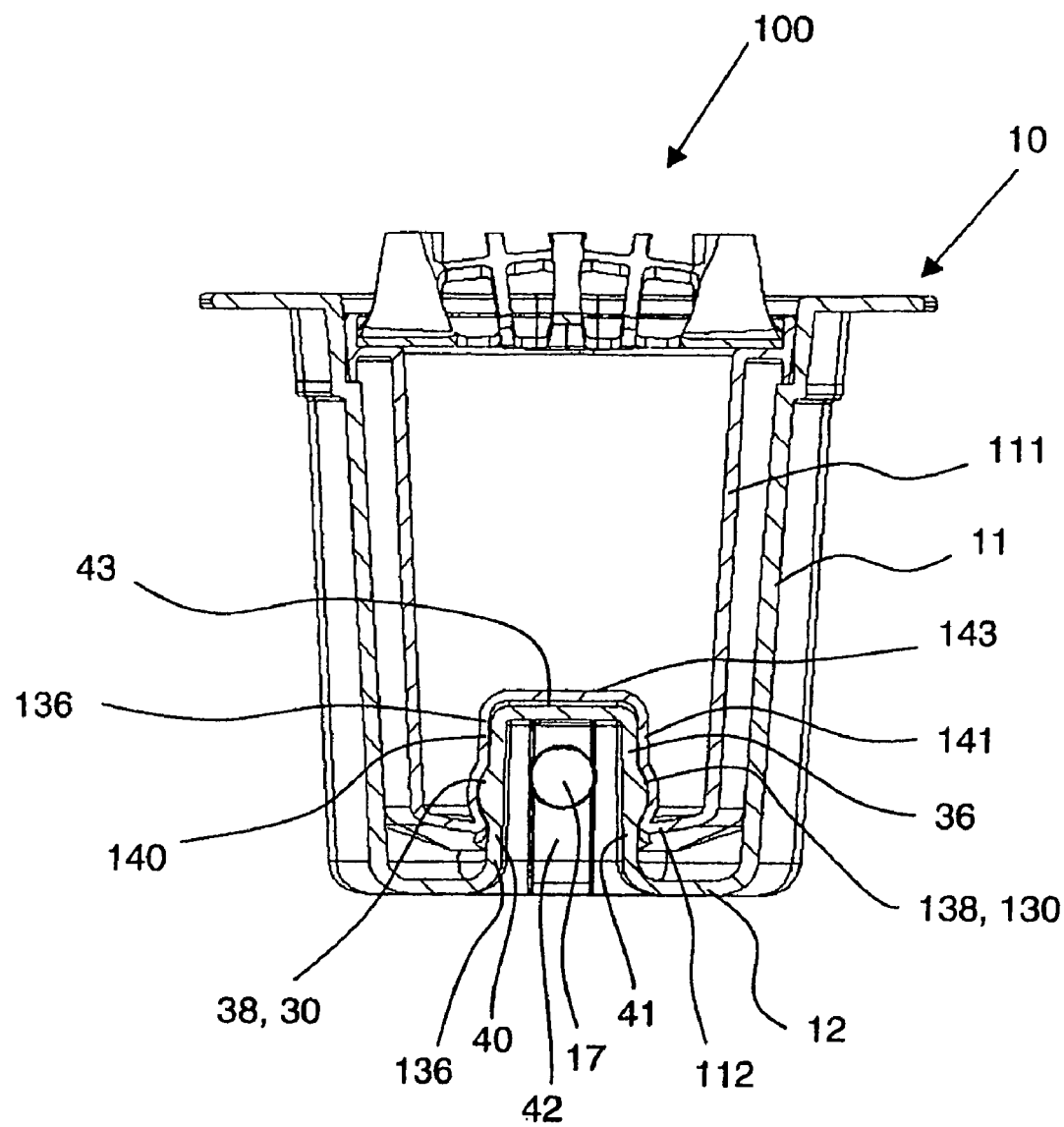
FIG. 18 shows a section on line B-B through the apparatus shown in FIG. 17.

FIG. 18 illustrates a section on line B-B. Fixing means 30, 130 in the form of latching elements are provided in the two side walls 40, 41, 140, 141 of the cuboidal indentations 36, 136. The latching elements are latching bosses 38 which engage in corresponding latching recesses 138.

This configuration of the latching elements is to be found on both cuboidal indentations 36, 37, 136, 137.

Figure 19:
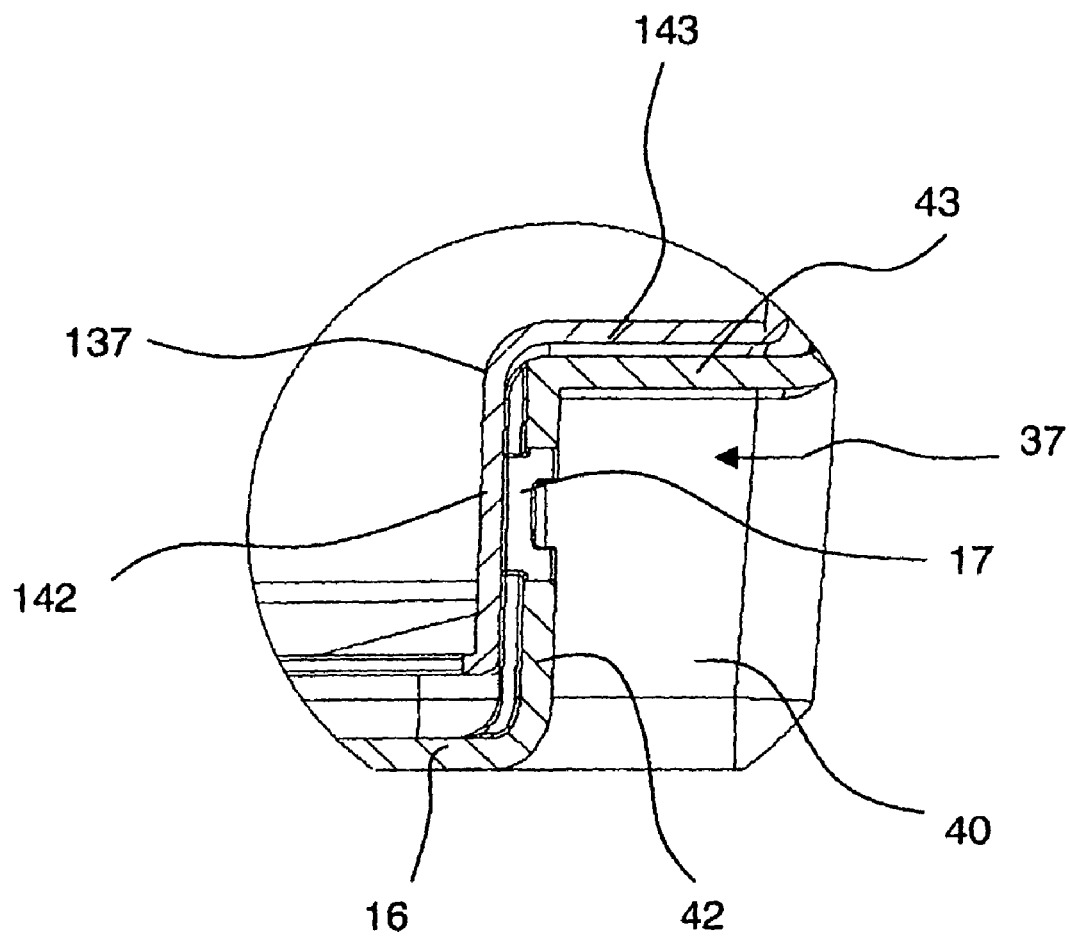
FIG. 19 shows an enlarged sectional illustration of the region of the outflow opening of the apparatus shown in FIG. 17.

FIG. 19 shows an enlarged illustration of the cuboidal indentations 37, 137.

Designations:

| | |
|---|---|
| 10 | Inlet funnel |
| 11 | Peripheral wall |
| 12 | Funnel base wall |
| 13 | Receiving opening |
| 14 | Receiving chamber |
| 15 | Peripheral wall |
| 16 | Base wall |
| 17 | Outflow opening |
| 18 | Free space |
| 20 | Holding element |
| 30 | First fixing means |
| 31 | First indentation |
| 32 | Frustoconical hollow body |
| 33 | Free edge |
| 34 | Bead in the form of an arc of a circle |
| 35 | Wall of the hollow body |
| 36 | Cuboidal indentation |
| 37 | Cuboidal indentation |
| 38 | Latching boss |
| 39 | End face |
| 40 | Side wall |
| 41 | Side wall |
| 42 | End wall |
| 43 | Covering wall |
| 60 | Sealing seat |
| 61 | Conically protruding edge section |
| 62 | Abutment section |
| 63 | Groove |
| 64 | Step |
| 65 | Inclined surface |
| 66 | Horizontal surface |
| 100 | Filter cartridge |
| 101 | Cartridge upper part |
| 102 | Inlet opening |
| 110 | Cartridge lower part |
| 111 | Peripheral wall |
| 112 | Base wall |
| 113 | Outlet opening |
| 120 | Securing flange on upper part |
| 121 | Securing flange on lower part |
| 130 | Second fixing means |
| 131 | Second indentation |
| 132 | Mandrel |
| 133 | Outer surface |
| 134a | Base wall |
| 134b | Annular wall |
| 135 | Second bead |
| 136 | Cuboidal indentation |
| 137 | Cuboidal indentation |
| 138 | Latching recess |
| 139 | Spacer rib |
| 140 | Side wall |
| 141 | Side wall |
| 142 | End wall |
| 143 | Covering wall |
| 160 | Sealing rim |
| 161 | Snap-action rim |
| 162 | Integral hinge |
| 163 | Encircling groove |
| 164 | Outer edge |
| 200, 200' | Throttling device |
| 201 | Flow passage |
| 202 | Annular passage |

The invention claimed is:

1. Apparatus for the filtration of liquids, having a filter cartridge (100), which includes a cartridge upper part (101) with at least one inlet opening (102), a cartridge lower part (110) with at least one outlet opening (113) and a sealing rim (160), and having an inlet funnel (10) with a peripheral wall (11), with a funnel base wall (12) and with a receiving opening (13), which is arranged in the funnel base wall (12) and into which the filter cartridge (100) can be fitted from above, the sealing rim (160) of the filter cartridge bearing against the edge of the receiving opening (13), a receiving chamber (14), which has at least one outflow opening (17) as well as a peripheral wall (15) and base wall (16), extending downwards from the receiving opening, wherein the inlet funnel (10) has an at least one first fixing means (30) below the receiving opening (13), the filter cartridge (100) has an at least one second fixing means (130) below and at a distance from the sealing rim (160), wherein the at least one second fixing means interacts with the at least one first fixing means (30) when the filter cartridge (100) is being fitted into the receiving opening (13), so that the at least one first and second fixing means (30, 130) indicate to a user when the cartridge is in position, define the position of the filter cartridge (100), and fix the cartridge axially in place and that at least one first fixing means (30) and/or the at least one second fixing means (130) forms a throttling device (200, 200'), to reduce the flow quantity delivered by the filter cartridge (100).

2. The apparatus according to claim 1, wherein the throttling device (200, 200') reduces the flow quantity delivered by the filter cartridge (100) by >0%-95%.

3. The apparatus according to claim 1, wherein the throttling device (200, 200'), can be set by selecting a receiving chamber (14) of suitable dimensions for a predetermined filter cartridge (100).

4. The apparatus according to claim 1, wherein the outflow opening (17) in the receiving chamber (14) is arranged above the outlet opening (113) in the filter cartridge (100).

5. The apparatus according to claim 1, wherein the filter cartridge (100) can be fitted into the receiving opening (13) in the axial direction.

6. The apparatus according to claim 1, wherein the second fixing means (130) is arranged in the region of the lower half of the filter cartridge (100).

7. The apparatus according to claim 6, wherein the second fixing means (130) is arranged in the region of the bottom third of the filter cartridge (100).

8. The apparatus according to claim 6, wherein the second fixing means (130) is arranged in the region of the base wall (112) of the filter cartridge (100).

9. The apparatus according to claim 1, wherein the first and/or second fixing means (30, 130) are spacer elements and/or guide elements and/or latching elements.

10. The apparatus according to claim 9, wherein the latching elements comprise latching bosses (38), latching recesses (138) or annular beads (34, 135).

11. The apparatus according to claim 1, wherein the first and the second fixing means (30, 130) are projections or recesses.

12. The apparatus according to claim 11, wherein the projections or recesses are cylindrical, conical or frustoconical.

13. The apparatus according to claim 1, wherein the base wall (16) of the receiving chamber (14) has at least one first indentation (31), and a base wall (112) of the filter cartridge (100) has at least one second indentation (131), which engages over the first indentation (31).

14. The apparatus according to claim 13, wherein the first and second indentations (31, 131), at least in subregions, are arranged spaced apart from one another.

15. The apparatus according to claim 13, wherein the first indentation (31) is a cylindrical or frustoconical hollow body (32), which is formed integrally on the base wall (16) of the receiving chamber (14), faces inwards and has at least one inwardly facing first bead (34), which is in the shape of an arc of a circle and leaves clear at least one outflow opening (17), arranged on its free edge (33), and an outwardly facing mandrel (132), which engages in the cylindrical or frustoconical hollow body (32) when fitting the filter cartridge (100), is arranged in the second indentation (131).

16. The apparatus according to claim 15, wherein the mandrel (132), on its outer side, has at least one second bead (135) in the shape of an arc of a circle, which engages behind the first bead (34) during fitting of the filter cartridge (100).

17. The apparatus according to claim 15, wherein the hollow body (32) and the mandrel (132) are each arranged centrally.

18. The apparatus according to claim 13, wherein the receiving chamber (14) has the first indentation (31) in the region of base and peripheral walls (15, 16), and the filter cartridge (100) has the second indentation (131) likewise in its base wall (112) and in a peripheral wall (111) of the filter cartridge (100).

19. The apparatus according to claim 13, wherein the first and second indentations (31, 131) are designed in a cuboidal form.

20. The apparatus according to claim 13, wherein the first indentation (31) has first latching means on two of its side walls (40, 41), and the second indentation (131) has second latching means on two of its side walls (140, 141).

21. The apparatus according to claim 1, wherein the sealing rim (160) is a snap-action rim (161), which is connected to one of the two cartridge parts (101, 110) via an integral hinge (162), it being possible for the snap-action rim (161) to be flipped from a first, lower snap-action position into an upper, second snap-action position, and vice versa, and the funnel base (12) has a sealing seat (60), which surrounds the receiving opening (13) and into which the snap-action rim (161) snaps in its second position.

22. The apparatus according to claim 21, in which the cartridge upper part (101) has an outwardly facing first securing flange (120) and the cartridge lower part (110) has an outwardly facing second securing flange (121), via which the two cartridge parts (101, 110) are connected, characterized in that the snap-action rim (161) is connected to one of the two securing flanges (120, 121) via the integral hinge (162).

23. The apparatus according to claim 21, wherein the sealing seat (60) merges into a conically projecting rim section (61) with an inwardly open abutment section 62), on which the outer edge (164) of the snap-action rim (161) engages.

24. The apparatus according to claim 23, wherein the abutment section (62) is a groove (63).

25. The apparatus according to claim 23, wherein the abutment section (62) is a step (64) with at least one inclined surface (65).

* * * * *